May 8, 1956     B. M. BIRD     2,744,628
JIGGING APPARATUS
Filed Oct. 18, 1952     2 Sheets-Sheet 1
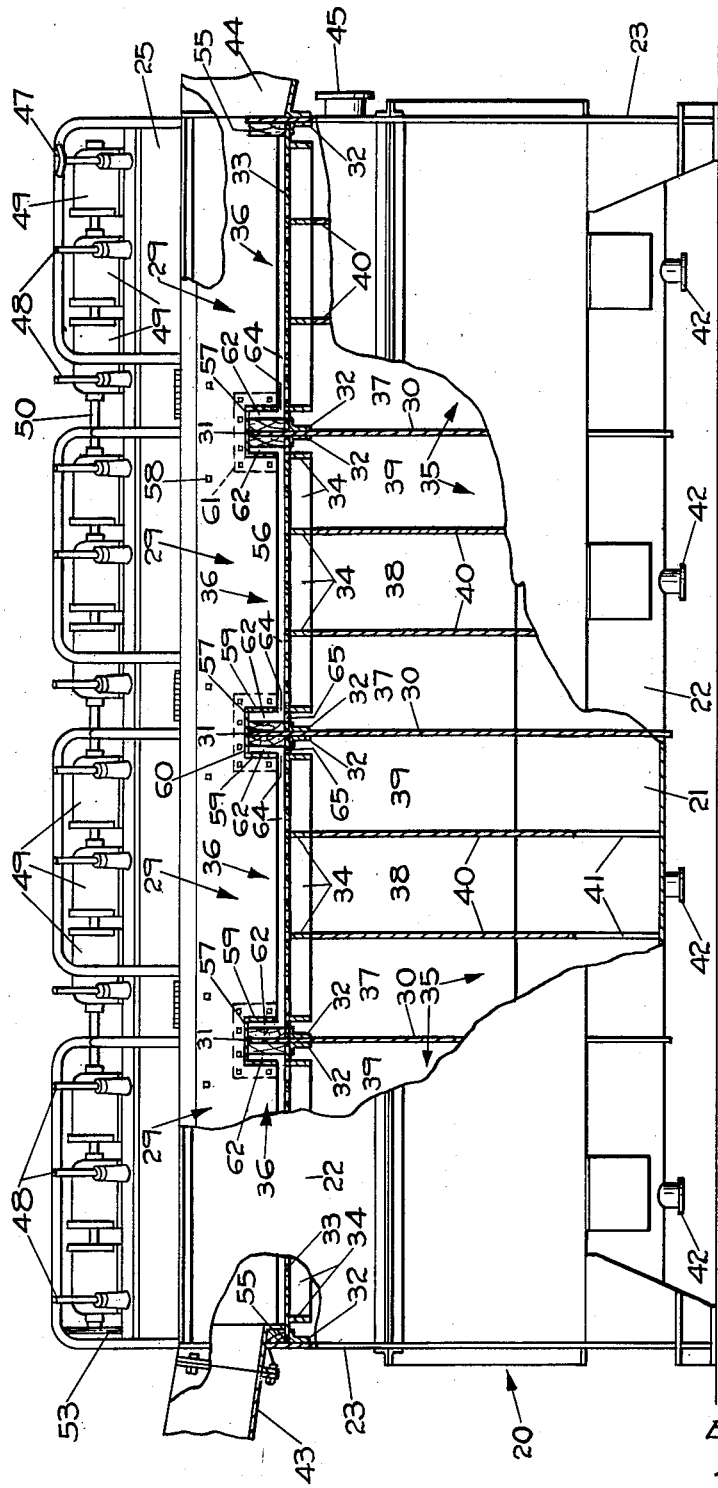
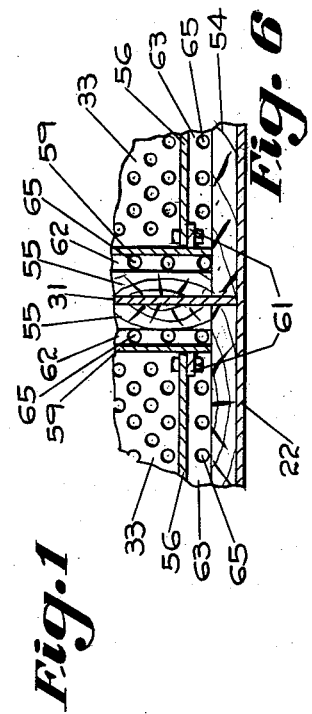
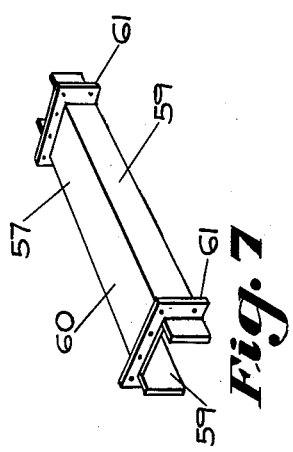
INVENTOR,
BYRON M. BIRD,
ATTY.

May 8, 1956　　　　B. M. BIRD　　　　2,744,628
JIGGING APPARATUS
Filed Oct. 18, 1952　　　　　　　　　　2 Sheets-Sheet 2
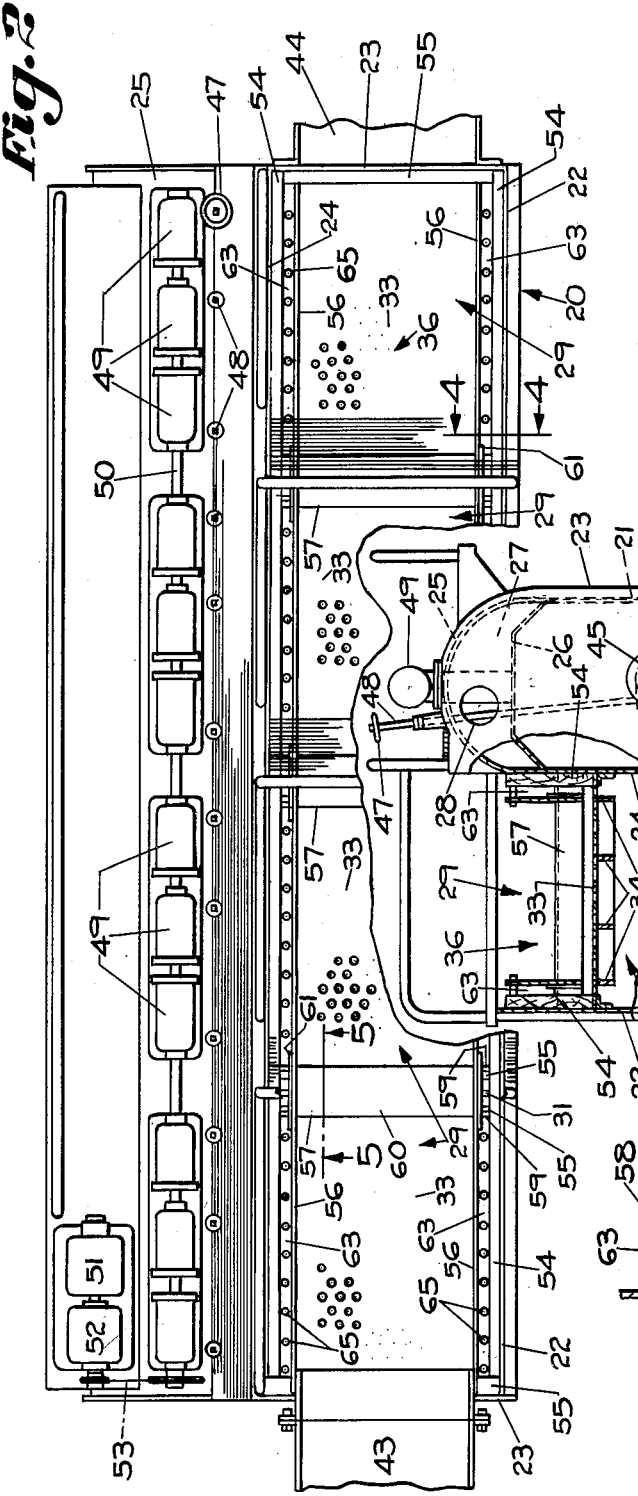
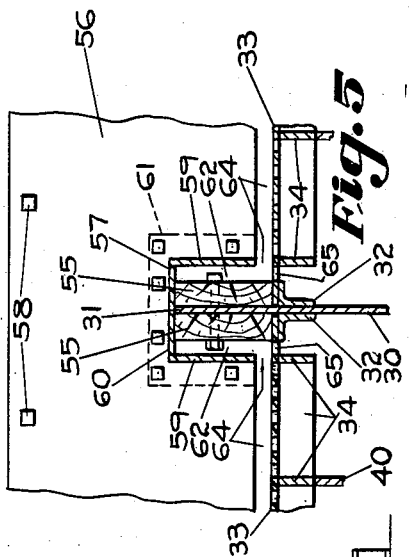
INVENTOR;
BYRON M. BIRD,
ATT'Y.

United States Patent Office 2,744,628
Patented May 8, 1956

2,744,628
JIGGING APPARATUS

Byron M. Bird, Columbus, Ohio, assignor to The Jeffrey Manufacturing Company, a corporation of Ohio Application October 18, 1952, Serial No. 315,556

2 Claims. (Cl. 209—455)

This invention relates to jigs in which materials to be separated are stratified within the jig in a jigging fluid which is caused to pulsate upwardly and downwardly.

One object of the invention is to provide an improved jigging apparatus of the above mentioned type.

Another object of the invention is to provide improved construction in a jig of the above mentioned type wherein objectionable currents of jigging fluid and materials being treated adjacent walls in the jig are minimized or eliminated completely.

Another object of the invention is to provide improved jig structure of the above mentioned type wherein material undergoing stratification above a screen is confined within a compartment by wall means and wherein provision is made for causing jigging fluid to pass from one to the other side of said wall means when the jigging fluid is caused to pulsate upwardly and downwardly in the jig, thereby minimizing or eliminating completely objectionable currents of jigging fluid and materials undergoing treatment in said compartment adjacent the said confining wall means.

Other objects of the invention will appear hereinafter, the novel features and combinations being set forth in the appended claims.

In the accompanying drawings:

Fig. 1 is a side view, partly in section and partly in elevation, showing a multiple cell jig including features of the invention;

Fig. 2 is a view in plan, with a portion broken away, of the jig shown in Fig. 1;

Fig. 3 is an end view, partly in section and partly in elevation, of the jig seen in Figs. 1 and 2;

Figs. 4 and 5 are views in section, the sections being taken on lines 4—4 and 5—5, respectively, of Fig. 2;

Fig. 6 is a view in section, the section being taken on line 6—6 of Fig. 4; and

Fig. 7 is a view in perspective of a weir means of the jig shown in Figs. 1 through 3.

The multiple cell jig shown in Figs. 1 through 3 of the drawings includes a tank 20 formed of opposite side walls 21 and 22 that merge at their bottoms to form the bottom of the tank 20, and opposite end walls 23. Extending longitudinally between the side walls 21 and 22 and joined at its ends to end walls 23 is a partition plate or wall 24 that extends vertically downwardly into the tank 20 formed by the walls 21, 22 and 23. The top of the wall 24 is connected to the side wall 21 by an elongated arcuate cover 25 which is also attached at its opposite ends to the end walls 23. Below the cover 25 there is an elongated deformed plate 26 that is connected along the opposite side edges to the partition wall 24 and the side wall 21 and at its opposite ends to the end walls 23.

The tops of side wall 21 and partition 24 cooperate with the arcuate cover 25 and partition 26 to provide a plenum chamber 27 for containing compressed air which is fed thereto through an inlet 28 in one of the end walls 23.

The function of the plenum chamber 27 will become apparent from the description that follows.

It will be seen, particularly by reference to Fig. 3 of the drawings, that the partition 24 which extends between the end walls 23 divides the tank 20 longitudinally into a U-shape, and by reference to Fig. 1 of the drawings that the tank 20 is further divided into four jig cells 29 by three transverse upright walls 30 that are joined to the partition 24 and along their opposite side edges to the opposite side walls 21 and 22 of tank 20. The shape of each of these walls 30 is such that as viewed in Fig. 3 of the drawings the part of its top edge and the leg or side of tank 20 directly below the partition plate 26 that forms the bottom of the plenum chamber 27 may be sealed therewith and so that its other top edge portion 31 will extend transversely across the other leg or side of the U-shaped tank 20 in which the stratification of materials occurs and terminates below the top edge of side wall 22.

Spaced below the top edge of portion 31 of each partition plate 30, the plates 30 and the walls 22 and 24 each carry a generally horizontally extending angle member 32 that cooperate in each jig cell 29 to support the edges of a screen 33 in the form of a perforated plate reinforced by a bottom "egg crate" or grid formed of interconnected cross bars 34. These screens 33 each divide or separate each of the jig cells 29 into a lower hutch compartment 35 and an upper compartment 36 in which the stratification of materials being separated occurs.

Each jig cell 29 is further divided into three chambers 37, 38 and 39 by two divider plates 40 which are identical in shape to that of the partition plates 30 but the tops of which at the sides of the screen grids abut the bottom of the screens 33 and are cut away to receive the grid thereof so that below it they terminate at and align with the bottoms of cross bars 34 whereby the chambers 37, 38 and 39 are extended upwardly to the bottom of screens 33. Divider plates 40 are cut out or notched at their bottoms to provide openings 41 through which hutched material in the bottom of the hutch compartment 35 which they divide may flow longitudinally along the bottom of each compartment 35 to a single drain valve 42 on the bottom of the tank, through which the hutched material may be removed from the jig.

Material to be separated in the jig is fed thereto through a feed chute or sluice 43 and in the jig the separated high specific gravity components thereof pass through the screen 33 to the hutch compartments 35 from which they are removed through the valves 42. The materials of less specific gravity pass from the jig through a trough or sluice 44.

Jigging fluid, preferably water, is supplied to the jig cells 29 through a header pipe 45 that extends through one of the end walls 23 and all of the walls 30 and 40 and is provided in each cell 29 with three outlet control valves 46, one of which is seen in Fig. 3 of the drawings, located one in each of the three chambers 37, 38 and 39. Valves 46 may be adjusted individually to control the quantity of jigging fluid supplied to the jig cell compartments 37, 38 and 39 by a removable hand wheel 47 that is interchangeable with any of the valve shafts 48 of valves 46.

Upward and downward pulsation or jigging movement of the jigging fluid in each of the cells 29 is caused by admitting cyclically air under pressure from the plenum chamber 27 to the closed tops of each of the chambers 37, 38 and 39 and then by releasing the air so admitted to the atmosphere. For thus cyclically admitting and releasing the air to and from the chambers 37, 38 and 39 there are a plurality of rotary valves 49, one associated with each of said chambers and driven from a common shaft 50 that is rotated by a motor 51 through a speed reducing mechanism 52 and a chain and sprocket drive indicated generally at 53. Each of the valves 49 may be identical to the valve shown and described by Orval R. Strawn in his United States Patent No. 2,281,530, dated April 28, 1942.

I have found that in any jig wherein material is stratified above a screen by upward or pulsion and downward or suction strokes of the jigging fluid through the screen there is a circulation of material being stratified along any upright wall in the separating chamber above the screen plate and that this circulation occurs in a vertical plane so that the particles move downwardly close to the wall and upwardly further out in the bed of materials being separated in a sort of circular motion. For instance, those particles within approximately one inch of the wall move downward, then turn and move upward at a distance of approximately three or four inches from the wall. Obviously this is highly undesirable in that it in part destroys the stratification that has occurred in the material.

The reason for this circulatory motion of materials adjacent the upright walls of the stratification chamber is probably that an upright wall in the bed of materials, either along the side or out in the middle of the bed, provides a path of low resistance for the downward currents of jigging fluid along the surface of the wall. For that reason the jigging fluid next to the wall travels more rapidly than in the major portion of the bed of materials where it must follow a tortuous path through the interstitial openings between the particles forming the bed. As a result of the rapid motion of the downward currents next to the wall, the particles of material are jammed together adjacent the wall on each downward or suction stroke and when the next upward or pulsion stroke occurs those particles next to the wall are the last to move upwardly because there is less resistance in the remainder of the bed. Because of this the upward motion of these particles lags on every upward or pulsion stroke and moves more rapidly on the downward or suction stroke and then away from the wall and into the main body of the bed of materials.

I have found that if the strong downward currents of jigging fluid adjacent any upright wall in the bed of materials are reduced the above described objectionable circulation of materials adjacent the wall will be alleviated and I have further found that the structure described herein will accomplish this result.

In the jig thus far described the screens 33 are held down upon their supporting angles 32 by a pair of side liner boards 54, preferably of wood, that extend longitudinally in the tank 20 and are notched to fit over the top portions 31 of the upright walls 30. One of the liner boards 54 is bolted to the side walls 32 of tank 20 and the other is bolted to the partition plate or wall 24. Along the upright transverse walls 30 and the end walls 23 the screen plates are held down by transversely extending liner boards 55 bolted to the top portions 31 of plates or walls 30 and the walls 23. Between the side boards 54 and resting upon the tops of the portions 31 and the transverse boards 55 is a removable frame assembly including a pair of spaced upright side walls 56 that extend between the end walls 23 of the tank 20 and which are spaced apart by three inverted U-shaped weirs 57 that span and rest upon the top edges of the transverse boards 55 and the portion 31 of wall 30 between each of the jig cells 29. Walls 56 are attached adjacent their tops to the side boards 54 by bolts and spacers indicated at 58.

Each of the weirs 57 includes a pair of spaced upright side members or walls 59 and a horizontal top wall 60 that interconnects the side walls 59. The ends of the weirs 57 extend through the spaced side frame walls 56 and are attached thereto by an angle frame 61 welded to the weir 57 and bolted to the frame side walls 56. As is evident from Figs. 4 through 7 of the drawings, the top wall 60 of each weir 57 terminates at the outside edge of each of the angle frames 61, while the side walls 59 extend beyond them and abut the side boards 54 to space properly the frame side walls 56 with respect to the side boards 54.

It will thus be seen that the non-stratifying chambers 62 formed between the upright side walls 59 in each weir 57 and the transverse liner boards or walls 55 which the weir spans or covers are directly connected through the ends and at the tops of the weirs 57 with non-stratifying chambers 63 formed between the spaced side liner boards 54 and the side walls 56 of the removable frame so that jigging fluid may flow from below the weir 57 to the spaces 63, and vice versa, when the jig is in operation.

It is important to note that the side walls 56 of the removable frame and the side walls 59 of the weirs 57 cooperate to form the upright side walls of a material stratifying chamber in each of the upper jig cell compartments 36 above the screens 33 and that their bottom edges are spaced above the screen plates 33 so that they will cooperate with the screen plate 33 to provide passageways 64 through which jigging fluid may flow from one side of the walls 56 and 59 to the other when the jig is in operation.

The screens 33 are perforated around their peripheries so that at least one row 65 of openings therein is substantially directly below each of the spaces 62 and 63 in order that jigging fluid may enter the spaces from the hutch compartment 35 during each upward or pulsion stroke thereof. The frame assembly including the side plates or walls 56 and weirs 57 may be lifted bodily from the jig when the bolts and spacers 58 are removed.

When the jig is operating to stratify material in the upper jig cell compartments 36 the vertical side frame walls 56 and the side weir walls 59 form the upright side walls of a stratifying chamber and confine the materials undergoing treatment in each jig cell to an area located in its entirety above the screen 33. The particles of high specific gravity separated from the beds of material pass through the screens 33 to the hutch compartments, and particles of material of less specific gravity either pass over the top plate 60 of one of the weirs 57 to enter a succeeding jig cell 29 or they pass into the discharge chute or sluice and leave the jig.

During each upward or pulsion stroke in each of the jig cells 29 the jigging fluid is forced from the hutch compartment 35 upwardly through the screen 33. Because there is substantially no material in any of the spaces 62 and 63 the jigging fluid will rise in the spaces 63 to a level slightly higher than in the stratifying chamber defined by the removable frame side walls 56 and the side walls 59 of weirs 57. Because the fluid in the spaces 62 and 63 is in communication with the fluid in the stratifying chamber through the passageways 64 it tends to seek a common level and therefore at the end of each upward or pulsion stroke there begins to occur a flow of jigging fluid from the outside of each of the walls 56 and 59 to the inside thereof, that is, from the spaces 62 and 63 through the passageways 64 and into the bed of materials which reduces the downward currents of jigging fluid and material in the material bed and adjacent the walls confining it, thereby minimizing or eliminating completely the hereinbefore described objectionable circulatory flow of jigging fluid and materials adjacent the walls confining the material bed.

Obviously those skilled in the art may make various changes in the details and arrangement of parts without departing from the spirit and scope of the invention as defined by the claims hereto appended, and applicant therefore wishes not to be restricted to the precise construction herein disclosed.

Having thus described and shown an embodiment of the invention, what it is desired to secure by Letters Patent of the United States is:

1. A multiple cell jig including a plurality of generally upright side and transverse wall means forming a plurality of side by side jig cells adapted to contain fluid, screen means adjacent the tops of said cells forming the bottoms of material stratifying chambers and the tops of hutch compartment, means through which fluid in said jig cells may be caused to pulsate upwardly and downwardly, removable frame means extending above said screen means and defining above each hutch compartment a material stratifying chamber, said frame means including opposite side wall means spaced from said jig cell side wall means and above said screen means, and open ended inverted generally U-shaped wall means interconnecting said opposite side wall means and spanning transverse wall means between each of said jig cells.

2. A multiple cell jig including a plurality of generally upright side and transverse wall means forming a plurality of side by side jig cells adapted to contain fluid, screen means adjacent the tops of said cells forming the bottoms of material stratifying chambers and the tops of hutch compartments, means through which fluid in said jig cells may be caused to pulsate upwardly and downwardly, means extending above said screen means and defining above each hutch compartment a material stratifying chamber, said means including opposite side wall means spaced from said jig cell side wall means and above said screen means, and open ended inverted generally U-shaped wall means interconnecting said opposite side wall means and spanning transverse wall means between each of said jig cells.

References Cited in the file of this patent

FOREIGN PATENTS

| | | |
|---|---|---|
| 68,965 | Austria | June 10, 1915 |
| 337,234 | France | Dec. 5, 1903 |
| 342,682 | Great Britain | Feb. 4, 1915 |